(12) United States Patent
Yamashita et al.

(10) Patent No.: US 7,486,875 B2
(45) Date of Patent: Feb. 3, 2009

(54) METHOD OF RECORDING MULTIPLE PROGRAMS OVER A SPECIFIED TIME PERIOD IN SEPARATE PROGRAM DATA FILES

(75) Inventors: Tomochika Yamashita, Yokohama (JP); Satoshi Takahashi, Chigasaki (JP); Atsuhiro Ono, Kitaura (JP); Toshiya Takko, Yokohama (JP); Nobumitsu Mabe, Hitachinaka (JP); Tomofumi Moriya, Yokohama (JP); Hiroki Fukumoto, Hitachinaka (JP); Chikara Maezono, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 581 days.

(21) Appl. No.: 11/002,846

(22) Filed: Dec. 3, 2004

(65) Prior Publication Data

US 2006/0024026 A1 Feb. 2, 2006

(30) Foreign Application Priority Data

Dec. 4, 2003 (JP) ............................. 2003-405763

(51) Int. Cl.
*H04N 5/91* (2006.01)
(52) U.S. Cl. ........................................ 386/83; 386/124
(58) Field of Classification Search ................... 386/83, 386/46, 52, 95, 111, 112, 125, 126; 725/38, 725/45, 56, 39
See application file for complete search history.

(56) References Cited

U.S. PATENT DOCUMENTS

| | | | |
|---|---|---|---|
| 5,576,773 A | | 11/1996 | Itagaki et al. |
| 6,166,778 A | | 12/2000 | Yamamoto et al. |
| 6,282,209 B1 | * | 8/2001 | Kataoka et al. ............. 370/498 |
| 6,445,872 B1 | | 9/2002 | Sano et al. |
| 6,499,138 B1 | * | 12/2002 | Swix et al. ..................... 725/38 |
| 6,901,603 B2 | * | 5/2005 | Zeidler et al. ................. 725/39 |
| 7,171,110 B1 | * | 1/2007 | Wilshire ..................... 386/125 |
| 7,245,819 B1 | * | 7/2007 | Sanders ....................... 386/46 |

(Continued)

FOREIGN PATENT DOCUMENTS

CN 1118966 3/1996

(Continued)

OTHER PUBLICATIONS

Machine translation of JP 2001-341156 to Yamada et al. (cited by applicant), Dec. 2000.*

(Continued)

*Primary Examiner*—David E Harvey
(74) *Attorney, Agent, or Firm*—McDermott Will & Emery LLP

(57) ABSTRACT

In digital broadcast recording for automatically recording broadcasts on a channel selected from a plurality of digital broadcast programs on a recording medium, in accordance with a booking that is performed by specifying a time zone and giving a command to record a stream of broadcast contents on the user-selected channel during the time zone, the stream of broadcast contents on the channel is recorded, separated into a plurality of units for the programs broadcasted during the time zone. Thus, the recorded stream can be handled program by program in a later editing or playback operation, despite that it was recorded by booked recording for which only the time zone was specified, and thus the user-friendliness is improved.

1 Claim, 9 Drawing Sheets

U.S. PATENT DOCUMENTS

| | | |
|---|---|---|
| 2002/0141580 A1 | 10/2002 | Okuyama |
| 2003/0172383 A1 | 9/2003 | Takagi et al. |
| 2004/0128317 A1* | 7/2004 | Sull et al. ................ 707/104.1 |
| 2007/0014533 A1 | 1/2007 | Korehisa et al. |

FOREIGN PATENT DOCUMENTS

| | | |
|---|---|---|
| CN | 1220066 | 6/1999 |
| JP | 6-325940 | 11/1994 |
| JP | 8-111823 | 4/1996 |
| JP | 8-289201 | 11/1996 |
| JP | 9-270969 | 10/1997 |
| JP | 2000-341156 | 12/2000 |
| JP | 2001-352517 | 12/2001 |
| JP | 2002-300517 A | 10/2002 |
| JP | 2003-46924 | 2/2003 |
| JP | 2003-199007 | 7/2003 |
| JP | 2005-86257 | 3/2005 |

OTHER PUBLICATIONS

Chinese Office Action (English translation) deleted Oct. 20, 2006.
Japanese Office Action issued in Japanese Patent Application No. JP 2003-405763, dated Apr. 3, 2007.
Chinese Office Action issued in Chinese Patent Application No. CN 2004100969219, dated Apr. 27, 2007.
Digital Video Broadcasting (DVB); Specification for Service Information (SI) in DVB systems. ETSI EN 300 468 V1.4.1 (Nov. 2001) European Standard (Telecommunications Series), pp. 1-83.

* cited by examiner

FIG.6

| BOOKING LIST | | | | | | |
|---|---|---|---|---|---|---|
| DATE | START | END | CHANNEL | TO BE RECORDED ON | AUDIO | |
| OCT.26 (FR) | 10:35 AM | 11:35 AM | BS181 | HDD | 1 MAIN + SUB | |
| NOV.22 (TH) | 10:35 ▲AM▼ | 11:35 AM | BS181 | HDD | 1 MAIN + SUB | |

SETTING CANNOT BE DONE FOR PROGRAMS BROADCASTED BEFORE THE PRESENT TIME

| RECORDING LIST | | | | | |
|---|---|---|---|---|---|
| DATE | START | DURATION | CHANNEL | MODE | PROGRAM NAME |
| OCT.26 (FR) | 10:35 AM | 00h25m | BS181 | TS | A |
| OCT.26 (FR) | 11:00 AM | 00h35m | BS181 | TS | B |

METHOD OF RECORDING MULTIPLE PROGRAMS OVER A SPECIFIED TIME PERIOD IN SEPARATE PROGRAM DATA FILES

This application claims the benefit of Japanese Application No. 2003-405763 filed in Japan on Dec. 4, 2003, the disclosure of which also is entirely incorporated herein by reference.

TECHNICAL FIELD

The techniques relate to a device and method for manipulating audio/video (AV) content transmitted by digital broadcasting and, more particularly, to a digital broadcast receiver incorporating an information recording medium such as a hard disk drive (HDD) and a digital broadcast recording method for use in such receiver.

BACKGROUND

Lately, broadcasting by way of broadcast satellites and communication satellites and, even in terrestrial broadcasting, so-called digital TV broadcasting are growing popular instead of traditional analog TV broadcasting. Digital broadcast receiving systems at home are coming into popular use. In these digital systems, a huge number of programs are broadcasted, because many more channels are available than are provided in the traditional analog broadcasting.

Since the digital broadcasting system broadcasts quite a great number of programs as described above, an electronic program guide called an Electrical Program Guide (EPG) by which a desired program can be selected quickly from a great number of digital broadcast programs has already been proposed, e.g., JP-A No. 08-111823. Also, its improvement ideas have been suggested, e.g., JP-A No. 08-289201 mentioned below.

Meanwhile, in view of numerous broadcast programs provided in the digital broadcasting system, a broadcast receiver in which broadcasted content (including, e.g., video/audio programs, programs provided by data broadcasting, and data provided by data broadcasting) can be stored in its internal storage means has already been made known, e.g., U.S. Pat. No. 6,166,778, which discloses a technique for improving the user-friendliness or usability in displaying what is termed a program listing that is used for making a program booking.

Moreover, US2002/0141580A1 discloses a device for manipulating the AV content as mentioned above, using a hard disk drive (HDD) or the like incorporated in the device. In particular, US2002/0141580A1 discloses a technique for ensuring the transfer (MOVE) of content recorded in the device even in case power supply disruption or the like should occur during the transfer.

SUMMARY

As described above, with the recent proliferation of digital broadcasting, various ideas have been proposed to improve the user-friendliness especially in displaying the program listing for broadcast program booking, as known in the above JP-A No. 08-289201 and U.S. Pat. No. 6,166,778, and the user-friendliness has been improved significantly. These improvements mainly aim to allow the user to make an intuitive choice of a program by using the logos or the like corresponding to the programs that are scheduled broadcast items or ensure that the user can confirm what is the booked program by viewing its detailed information given in a formal program information box that is always shown in a part of the screen. However, in consideration of specifying a time zone (starting from a desired time in future or the present time and terminating at a desired time in future) and making a booking for recording the broadcast stream during that time zone, instead of booking a program to be recorded from the program listing, the following problem still exists.

Making a booking for recording a broadcast program from the program listing is possible for programs scheduled for a week ahead at longest even by using, e.g., the above electronic program guide called the EPG (in general, a program guide contains data for only a week ahead). Thus, it is impossible to fulfill a need for booking a program scheduled after the week ahead (in future). Consequently, to make a booking for recording a program scheduled to be broadcasted after a week ahead, for example, the user must use the above method of specifying a time zone and making a booking for recording the broadcast stream during the time zone. After selecting a desired channel, some user may set a desired time zone only for broadcasts on the channel and request a booking for recording the broadcast stream during the time zone without regarding what programs will be broadcasted in the time zone or because he or she does not want to bother to perform the booking operation.

However, if, after selecting a desired channel, the user requests a booking for recording the broadcast stream on the channel only for the desired time zone, the stream of program data will be recorded and stored in a single file on the medium, e.g., the HDD. This poses a problem in which the user may feel inconvenience of manipulation when editing the stream afterward. That is, if a plurality of programs are broadcasted during the desired time zone (usually, for a few hours), the user will have to separate the broadcast stream into the plurality of programs and edit each program in the edit operation and, as a result, may delete an unwanted program.

The present technique aims to overcome the above problem of the prior art and its objective is to provide a digital broadcast receiver that enables automatic recording of the broadcast stream on a channel selected from a plurality of digital broadcast programs onto a recording medium. Even when a booking is performed only by specifying a time zone and giving a command to record a stream of broadcast contents on the user selected channel during the time zone, the digital broadcast receiver will record the broadcast stream in such a manner in which the stream is easy to manipulate afterward, thereby it can improve the user-friendliness of later manipulation of the recorded broadcast stream. Another objective of the technique is to provide a digital broadcast recording method for use in the above receiver.

In order to achieve the foregoing objectives, there is provided a digital broadcast recording method for recording broadcasts on a channel selected from a plurality of digital broadcast programs on a recording medium. By this method, in accordance with a booking that is performed by specifying a time zone and giving a command to record a stream of broadcast contents on the user-selected channel during the time zone, the stream of broadcast contents on the channel is recorded, separated into a plurality of units of programs broadcasted during the time zone.

In the digital broadcast recording method, it may also be possible that after recording the stream of broadcast contents on the user-selected channel during the time zone, when the recording details are displayed, at least one of the plurality of separate broadcast programs recorded is displayed. It may also be possible that the command to record the stream of broadcast contents on the user-selected channel includes specifying a time zone from the present time or booking a desired future time to start recording.

For example, the digital broadcast stream is recorded on a hard disk drive and the stream of broadcast contents on the user-selected channel is recorded, separated into a plurality of files of the programs broadcasted during the time zone.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitations. In the figures, like reference numerals refer to the same or similar elements.

FIG. 6 illustrates a booking list window that is shown when making a booking for recording in which the user can specify a desired channel and time zone.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
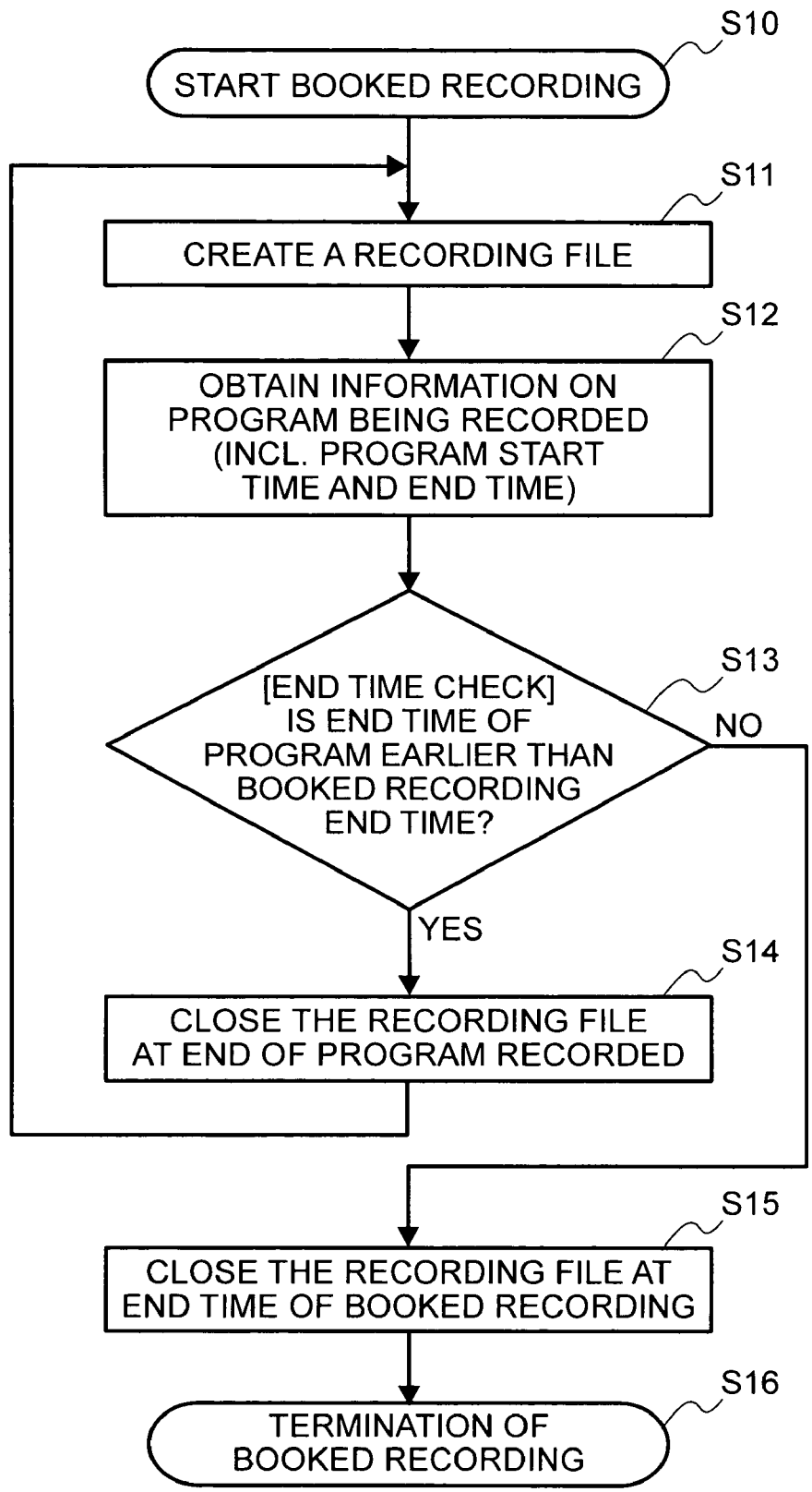
FIG. 1 is a flowchart to explain a digital broadcast recording method that is applied in the digital broadcast receiver.

FIG. 1 is a flowchart to explain the process of booking and recording a program. In order to implement the process, the recorder apparatus is structured as shown for example in FIG. 2.

Figure 2:
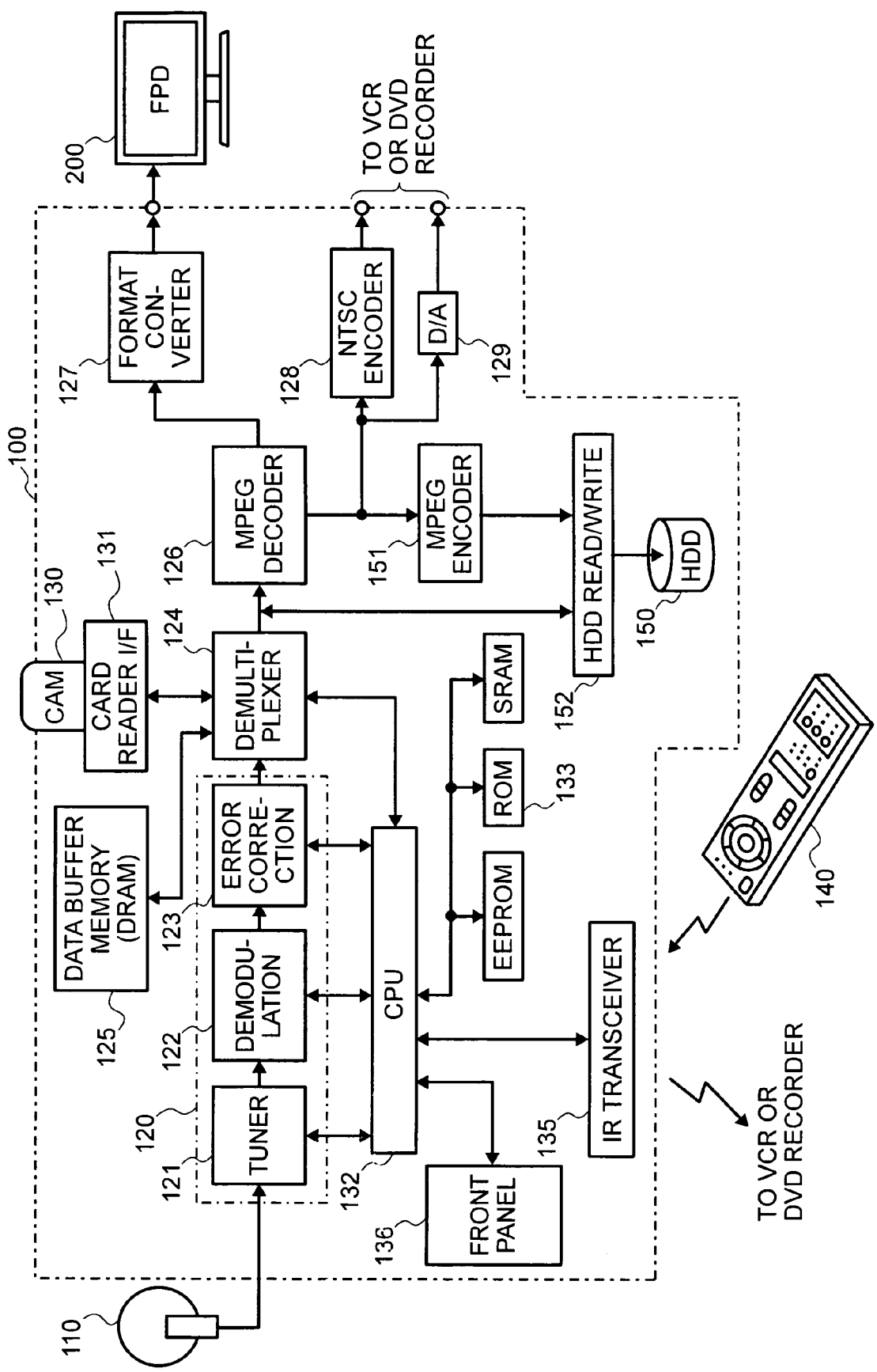
FIG. 2 is a block diagram showing the detailed internal configuration of an example of the digital broadcast receiver.

FIG. 2 attached is a block diagram showing an example of a digital broadcast receiver configuration with recording and reproducing capabilities. In this figure, reference numeral 100 denotes an AV device (digital broadcast receiver) that receives digital broadcasts and displays the broadcast content (including video/audio programs, programs provided by data broadcasting, and data provided by data broadcasting) on what is called a flat panel display (FPD) 200, such as a plasma display panel and a liquid crystal display panel. Those skilled in the art will recognize that the A/V device is capable of working with other types of displays.

In FIG. 2, reference numeral 110 denotes a parabola antenna for receiving digital broadcasts. From this antenna 110, an RF signal is supplied to a tuner 121 which is a constituent of a tuner module (or front end) 120 in the digital broadcast receiver 100. The output of the tuner 121 is supplied to, e.g., a QPSK demodulation circuit 122 which is also a constituent of the tuner module 120 and QPSK demodulated by this demodulator. Then, the output of the QPSK demodulation circuit 122 is supplied to an error correction circuit 123 which is also a constituent of the tuner module 120. In this circuit 123, any error that occurred during transmission is detected and corrected. Consequently, this tuner module 120 picks out channel signals with a specified frequency and extracts the transport stream (TS).

A demultiplexer 124 receives the transport stream output from the error correction circuit 123 of the tuner module 120 and temporarily stores the transport stream into a data buffer memory (Dynamic Random Access Memory (DRAM) or Static Random Access Memory (SRAM)) 125. Then, the demultiplexer 124 reads the transport stream in order and breaks out selected video and audio streams which are in turn supplied to an MPEG decoder 126. In other words, demultiplexing by the demultiplexer 124 is to extract necessary streams from the transport stream (TS) that consists of a plurality of video and audio streams multiplexed by a multiplexer (MUX) of the transmitter. The demultiplexer 124 performs so-called filtering to extract necessary streams from the packets of different streams. In a table named PMT (Program Map table) for a channel tuned in, the packet IDs (PIDs) of audio and video streams constituting a broadcast on the channel are specified. On the receiver, the demultiplexer 124 filters the packets by the PIDs and extracts the video and audio streams from which a desired program can be presented or recorded. Signals in section form such as Service Information (SI) included in the transport stream are read in by using table IDs besides the PIDs.

Figure 3:
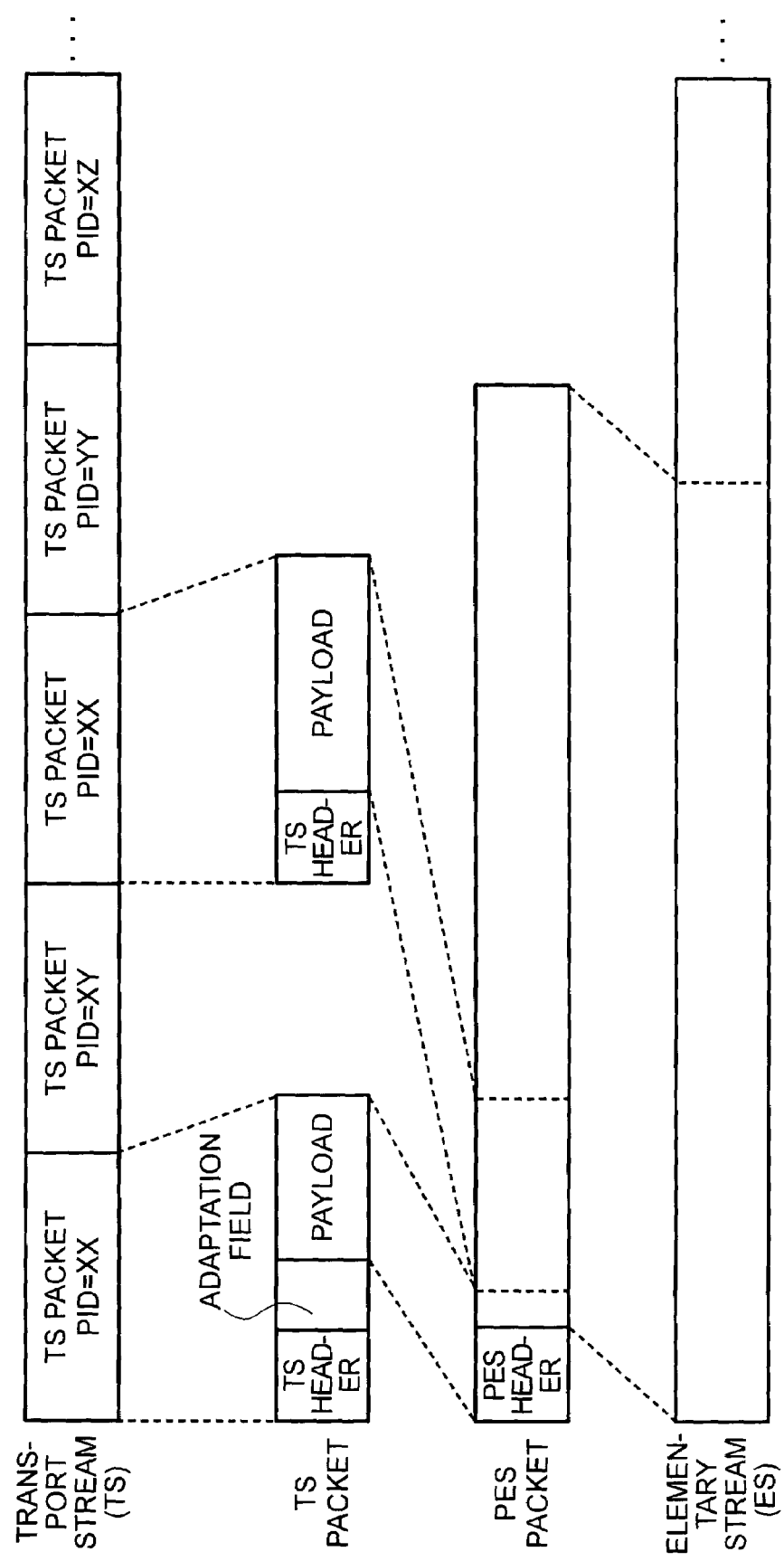
FIG. 3 is a diagram to explain the format and contents of a broadcast data stream that is received by the above digital broadcast receiver.

As is shown in FIG. 3 attached, in particular, the demultiplexer extracts TS packets of only the selected program from the transmitted signal stream consisting of time-division multiplexed transmission units which are called TS packets and assembles the extracted TS packets into a Packetized Elementary Stream (PES) and a video/audio Elementary Stream (ES). In the payloads of other TS packets, data in form called 'section' is also stored and transmitted in addition to the PES which is packetized video/audio elementary stream (ES). At least some of the data in the section form corresponds to information that is displayed as the EPG and comprises various kinds of information such as program sequence information (SI; service information) and information for channel selection. The SI consists of data in the 'section' form describing program and service information such as an Event Information Table (EIT) and a Service Description Table (SDT). The SI data is extracted by processing TS packets containing appropriate packet ID (PID) values for the desired SI table(s).

Figure 4:
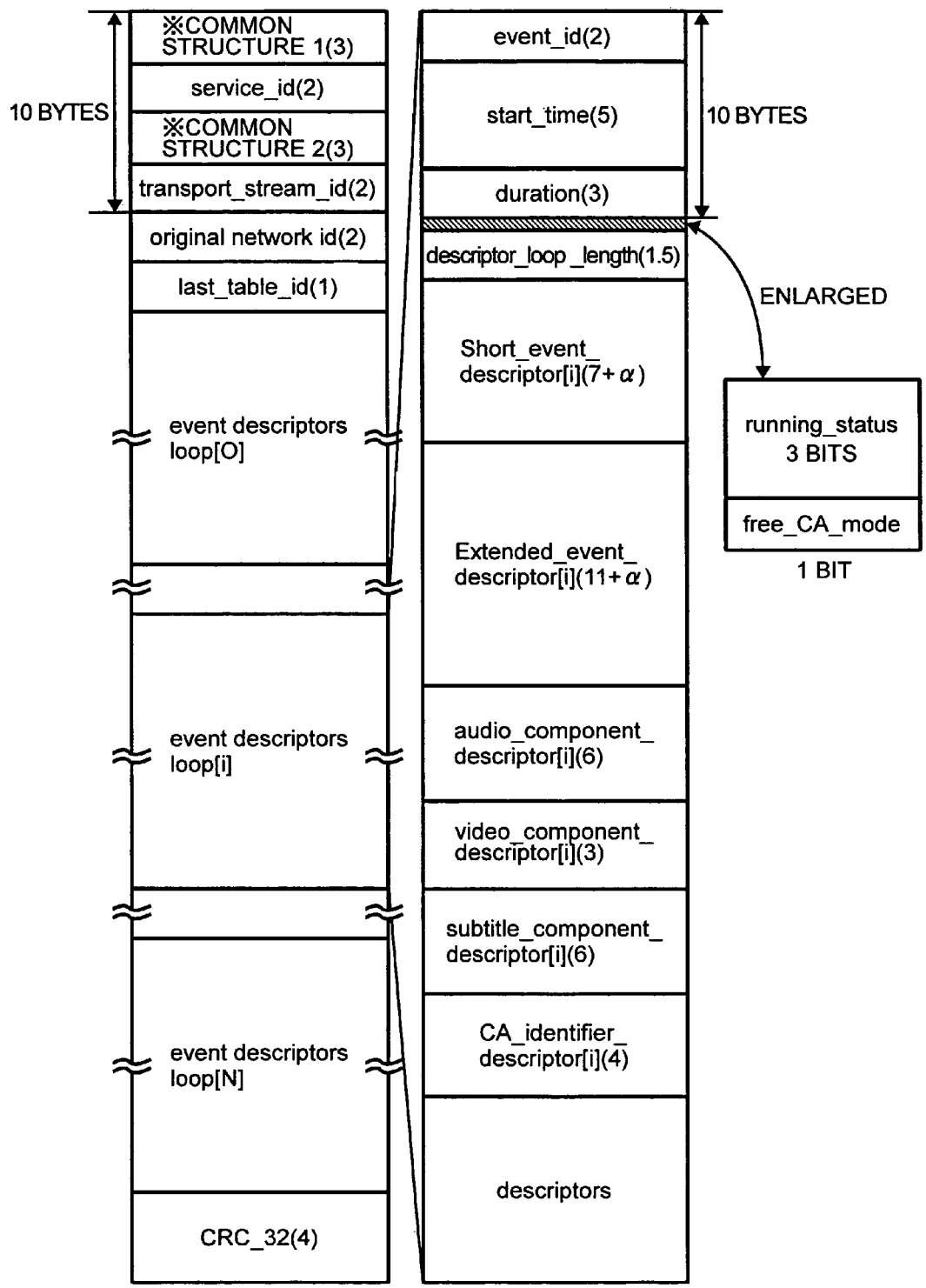
FIG. 4 is a diagram showing an illustrative structure of an Event Information Table (EIT) included in the broadcast data stream received by the above digital broadcast receiver.

An illustrative structure of the EIT is shown in FIG. 4 attached. In FIG. 4, each portion of event descriptors begins with an event_id (2) field which gives the identifier of the event (program) that is described, followed by a start_time (5) field which contains the event start time described in UTC (Coordinated Universal Time) and MJD (Modified Julian Day). The next during (3) field contains the duration of the event (program) in hours, minutes, and seconds. By using the program sequence information SI and EIT information constituting a part of the video/audio stream transmitted in the TS packets and extracted by the demultiplexer 124, extracted program data can be identified program by program, according to the program details.

Another example of the EIT from the TS is described, for example, in ETSI EN 300 468 V1.4.1 (2000-11) p21-22. In this description, the EIT shall have the predetermined PID0x0012, and the four classifications of EIT have been identified, distinguishable by the use of different table_ids. The table_id shows the attribute of the transmitted data. For example we can know that the data is "Present/following" data or scheduled data, and that the data is for actual TS or another TS. The demultiplexer 124 detects the predetermined PID and the table_ids, and extracts data from the TS. That is why the demultiplexer can get and arrange the extracted information based on EIT.

Returning to the above FIG. 2 again, in the meantime, a card reader interface (I/F) 131 is also connected to the demultiplexer 124 to read key data from a Conditional Access Module (CAM) 130 that was inserted into it. The CAM 130 consists of an IC card having CPU, ROM, RAM, and other elements arranged therein. Key data required for decryption as well as a decryption program are stored in the IC card 130. The decryption is to perform what is called descrambling for scrambled and transmitted signal streams for, e.g., charged broadcasts, in order to present a program from these signal streams. Here, the key data is read from the CAM 130 via the card reader I/F 131 and supplied to the demultiplexer 124, and the demultiplexer 124 decrypts the encrypted signal streams with this key.

Then, the video and audio streams extracted by the demultiplexer 124 are supplied to the MPEG decoder 126. The MPEG decoder 126 stores the input digital signal streams in order into its internal DRAM or the like and decodes the video and audio signals compressed by MPEG (especially MPEG2). Then, the decoded video and audio signal streams are converted into a predetermined format by a format converter 127 shown and output to the flat panel display (FPD) 200, such as a plasma display panel and a liquid crystal display panel. Alternatively, the signal streams are further converted into NTSC video signal or analog audio signal streams by an NTSC converter 128, a D/A converter 129, and the like and output through certain interfaces to external devices, such as CRT, VCR, and DVD recorders.

In the above FIG. 2, a Central Processor Unit (CPU) 132 is placed in the digital broadcast receiver 100 and the CPU performs various kinds of processing, according to programs stored in a ROM 133 and/or other program memories. The CPU controls, e.g., the tuner 121, QPSK demodulation circuit 122, and error correction circuit 123 which constitute the tuner module 120, and other components. The receiver is also equipped with an IR transceiver 135 which emits or receives infrared control signals and the CPU outputs or receives predetermined control signals to/from an external AV device through the IR transceiver.

Various commands can be input directly to the CPU 132 by operating manual operation buttons and switches on the front panel 136 located on the front surface of the receiver 100. Besides, a so-called remote controller 140 is available. The commands can also be input by operating the buttons and keys on the remote controller. An input infrared signal from the remote controller 140 is emitted from the IR transmitter provided on the top end of the remote controller toward the IR transceiver 135. This input signal is input to the CPU 132 and thus a predetermined command can be input to the CPU by operating the remote controller as well.

In the above FIG. 2, the digital broadcast receiver 100 further includes a hard disk drive (HDD) 150 for recording the contents (video and audio information) of programs. Data is recorded on the HDD 150 as follows. Video and audio signal streams decoded by the MPEG decoder 126 are compressed into digital signal streams again by an MPEG encoder 151. The digital signal streams are recorded on the HDD 150 by a HDD read/write circuit 152 which performs data recording by executing a predetermined recording process. As is indicated by a bidirectional arrow shown, the video and audio signal streams decoded by the MPEG decoder 126 are directly input to the HDD read/write circuit 152. When information once recorded on the HDD is played back, compressed signal streams are read from the HDD 150 by the HDD read/write circuit 152 from which the signal streams are input to the MPEG decoder 126 again. Then, the video and audio signal streams are decoded and the decoded signal streams are, after converted into a predetermined format by the format converter 127, output to the flat panel display 200 and played back or output to the external device such as VCR and DVD recorders.

Next, operation of the digital broadcast receiver 100 in which the present technique is embodied, the configuration of which has been explained above in detail, particularly, its digital broadcast recording operation will be discussed in detail hereinafter. The following description focuses on what is called manual booking in which a booking is made by directly specifying a program of broadcasts to be recorded, time to start recording and its end time, and date (that is, the user should specify a desired channel and a desired time zone for recording broadcasts on the program during the time zone only without specifying what program is to be recorded).

Figure 5:
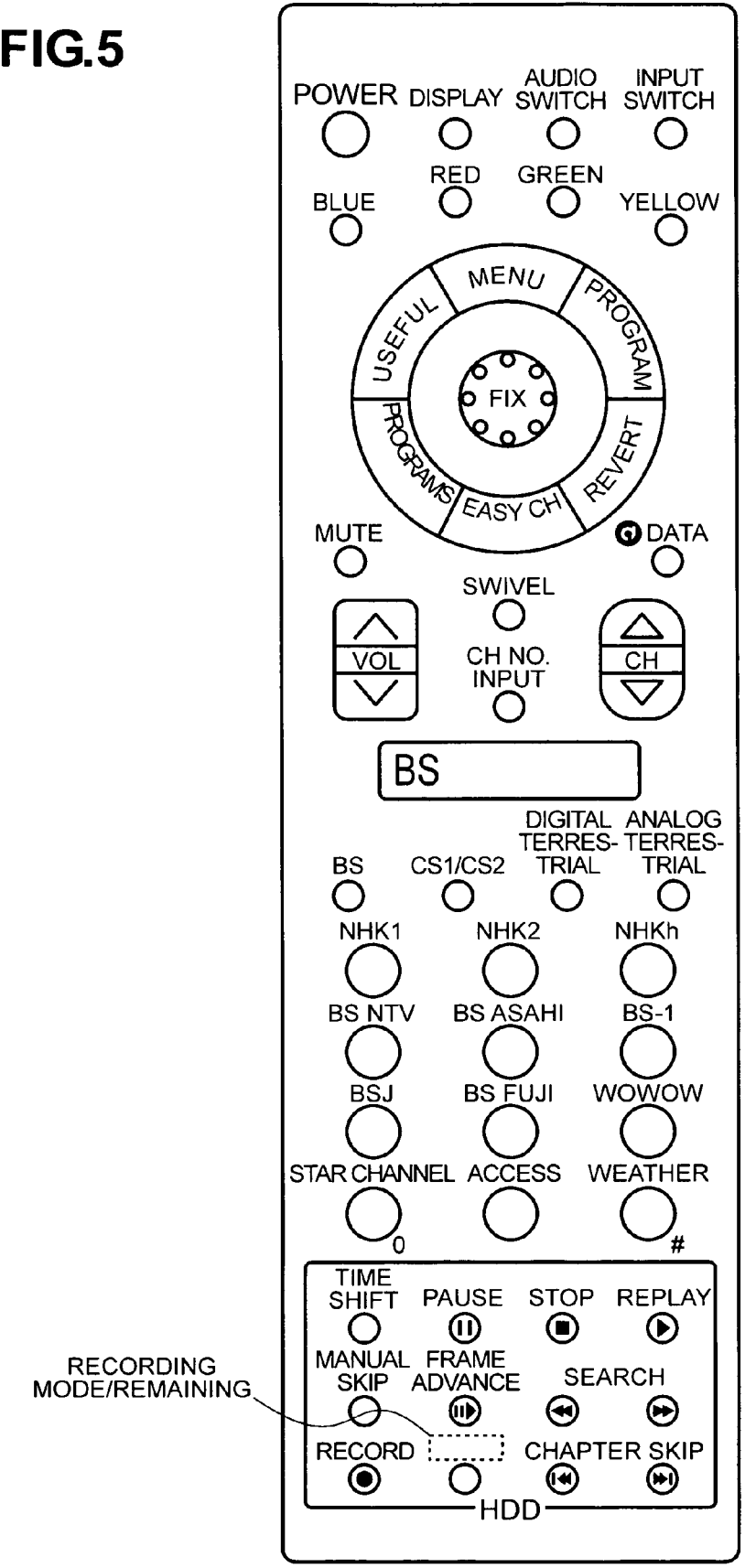
FIG. 5 is a front view of a remote controller that is used for recording operation with the above digital broadcast receiver to show its illustrative key/button arrangement.

For purposes of discussion, the manual booking is performed, using the remote controller 140 whose detail is shown in FIG. 5 attached for operational command input, although of course the front panel could be used. First, a user chooses to press a "USEFUL" key 141 out of a plurality of sector-form keys arranged circularly on a multi-selector provided in the upper part of the remote controller 140. This brings up a plurality of windows including a "booking list" on the display screen of the FPD 200. Then, the user can choose the "booking list" by activating a "FIX" key in the center of the multi-selector on which the sector-form keys are arranged circularly. This causes the "booking list" which is illustrated in FIG. 6 attached to be fully shown on the display screen of the FPD 200. On this "booking list" window, the user can make a booking for recording broadcasts on a desired channel by specifying a time zone. In this example, a booking is made for recording broadcasts on a BS181 channel during a time zone from 10:35 to 11:35 AM on October 26(FR) and the broadcasts should be recorded on the HDD (hard disk drive), including both main and sub audio channels.

Of course, booking and recording digital broadcasts may be performed, using a window other than the above one. Alternatively, for instance, recording of a broadcast may be performed as follows: the user press as a "RECORD" button 143 located in the lower part of the remote controller 140 to record the broadcast and press a "STOP" button 144 to terminate the recording. In this case, it is possible to book only the time to terminate the recording, though its illustration is not provided.

Next, in the case where recording is performed in accordance with a booking in which the user specified a desired channel and a desired time zone only without specifying what program as discussed above, the operation of the digital broadcast receiver 100 will be described in detail below, referring to a flowchart shown in FIG. 1 attached.

First, booked recording is discussed. When the booked time to start recording comes, the receiver automatically starts booked recording operation (step S10). With the start of the booked recording operation, a recording file is created (step S11). Then, the video and audio signal streams on the specified channel are stored into the created recording file and thus recorded on the HDD 150 which forms a part of a broadcast recording section. Specifically, the signal streams decoded by the MPEG decoder 126 are recompressed by the MPEG encoder 151 and the thus compressed signal streams are recorded on the HDD by the HDD read/write circuit 152. Meantime, in the present technique, the EIT information as the program sequence information (SI) is obtained as picture program information from the video and audio streams (step S12). According to this picture program information (EIT information), a broadcast program can be identified. That is, it can be determined whether the video and audio signal stream of a program being recorded on the HDD 150 is of the same program or has changed to the stream of another program (the preceding program has terminated).

Next, end time checking is performed (step S13). Here, if the end of the program being recorded is detected in the step S12; that is, if recording has just proceeded to the video and audio signal stream of another program, according to the picture program information (EIT information), it is determined whether the end time of the program is earlier than the booked recording end time. In the case of booked recording of a specified program, the recording normally terminates at the end time of the program. In the case being discussed where recording is performed during the set time zone, however, if it is determined that the time at which the program terminated is earlier than the booked end time of recording ("YES"), in parallel with the end of the program recording that was being performed, the program's recording file is closed (step S14) but recording continues (return to S11). That is, upon the end of the program on the channel being recorded, its recording file is closed. In this example, more specifically, in the step S14, it is determined whether the end time of the program recorded is earlier than the booked program end time. Accordingly, if recording of the next program is beyond the preset time zone, the recording operation will continue until the end of the program and terminate.

Then, the procedure returns to the step S11 and a new recording file is created (step S11). Then, the steps S12 and S13 are repeated and the process continues until the preset end time of the booked recording operation. After a "NO" decision is made in the step S13; that is, after the preset time zone has elapsed, the recording file of the program recorded is closed (step S15), when the booked program operation terminates (step S16). As noted above, if the recording operation is to continue until the end of the program and terminate, the booked recording operation terminates upon the termination of the recording of the program being recorded.

The operation of the above-discussed digital broadcast receiver 100 in which the present technique is embodied, particularly, the operation in the case where recording is performed in accordance with a booking in which the user specified a desired channel and a desired time zone only will be explained with reference to FIG. 7 attached.

Figure 7:
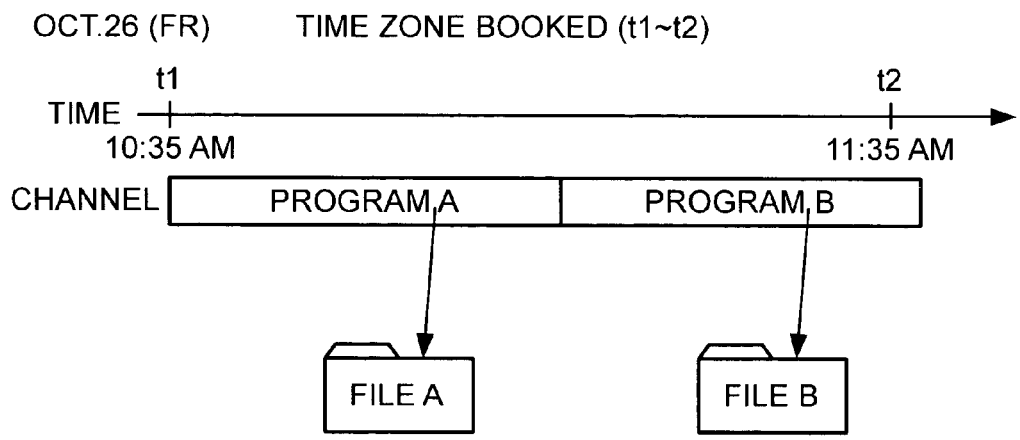
FIG. 7 is a diagram to explain creating files when booked recording of broadcasts on the user-specified channel and during the user-specified time zone is performed.

In FIG. 7, it is assumed that a time zone of t1 to t2 is set for the duration of recording broadcasts on a desired channel and program A and program B are broadcasted in time sequence on the channel during the time zone. For purposes of the example, farther assume and, particularly, that program B is broadcasted somewhat beyond the set time zone of t1 to t2. According to the recording method applied in the digital broadcast receiver 100 in which the present technique is embodied, as is apparent from the figure, when the individual programs are broadcasted in time sequence on the channel for which booked recording was set, the contents of the broadcast (video and audio data) are stored in different files (file A and file B) and recorded on the HDD 150 which forms a part of the broadcast recording section. In this case, if the end time of the last broadcast to be recorded is beyond the set end time of recording, e.g., like program B in this figure, the whole program B will be stored into the file B up to its end.

As discussed above, in the case where recording is performed in accordance with a booking in which the user specified a desired channel and a desired time zone only, recorded video and audio data of different programs is separated per program and stored into separate files (file A and file B). Next, the operation of playing back the video and audio data stored in these files will be discussed with reference to FIGS. 8 through 10 attached.

Figure 8:
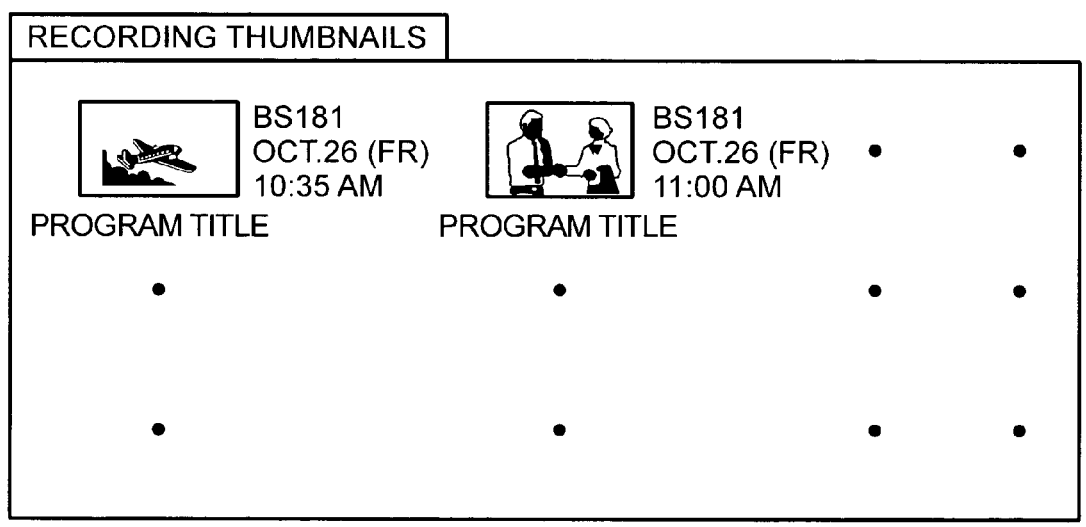
FIG. 8 illustrates an example of a thumbnail-style display of a list or menu of items recorded during the user-specified time zone are shown per program when the user considers play back of the recording or otherwise reviewing available recordings.

First, FIG. 8 attached illustrates an example of the so-called thumbnails of the recorded programs that are displayed on the FPD 200 when the user is going to play back the video and audio data recorded in the manner described above. The thumbnails are displayed by choosing a "PROGRAMS RECORDED" key 145 on the remote controller 140 shown in the above FIG. 4. When, for example, a channel BS181 and a desired time zone (10:35 to 11:35 AM) on Oct. 26 (FR), 2003 are specified and booked recording is performed, the two programs (programs A and B) broadcasted during the time zone are recorded in separate files (files A and B) as discussed above and, afterward, the separate thumbnails for the separate programs are displayed for selection of the recorded data to be played back. It is also possible to display the thumbnails of moving pictures of the recorded programs.

Figures 9, 10:
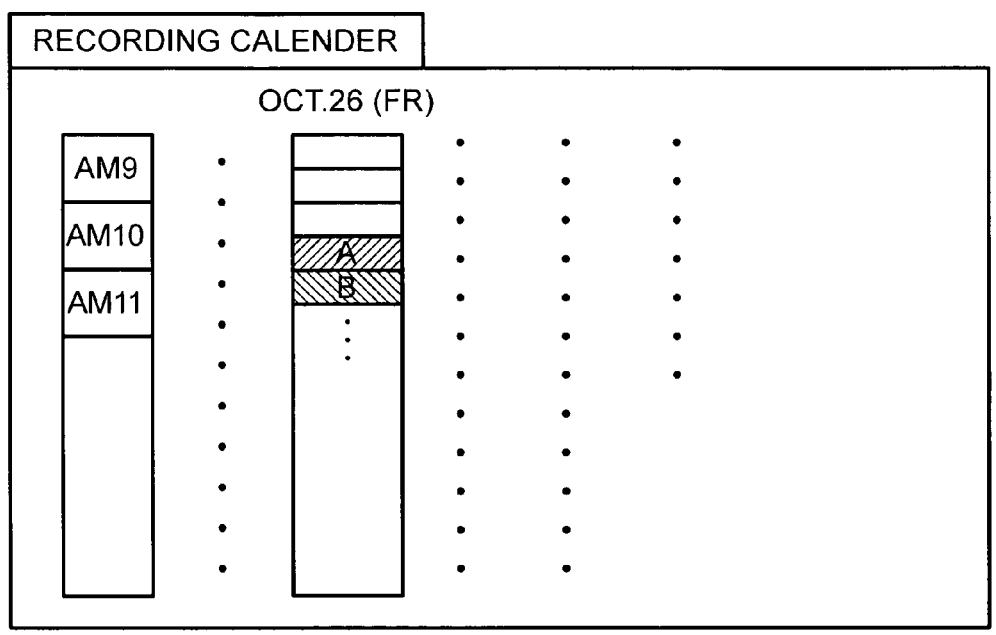
FIG. 9 illustrates an example of a calendar-style display in which the broadcast items recorded during the user-specified time zone are shown per program when the user is going to play back the recording.
FIG. 10 illustrates an example of a list-style display in which the broadcast items recorded during the user-specified time zone are shown per program.

FIG. 9 attached illustrates a display screen example on the FPD 200 where separate program items from the separate files (files A and B) of the two programs recorded (programs A and B) are shown in a calendar style as recording details for the same purpose as in the above example. In the column under a date in the crosswise column field, the items of broadcasts on the channel recorded in the day are shown with the program names associated with the time zone indicated in the left row field. FIG. 10 attached illustrates a display example of recording details in a list style. By the manner in which a plurality of programs broadcasted on the user-selected channel during the time zone that was booked are recorded in separate files, recording details can be displayed per program separately, which will help the user in playing back the recorded data after the recording. Not only when playing back the recorded data, but also when the user is going to edit the recorded data afterward, the user can easily confirm the details (program names and other information) of the recorded broadcasts, which is also convenient for the user.

Figure 11:
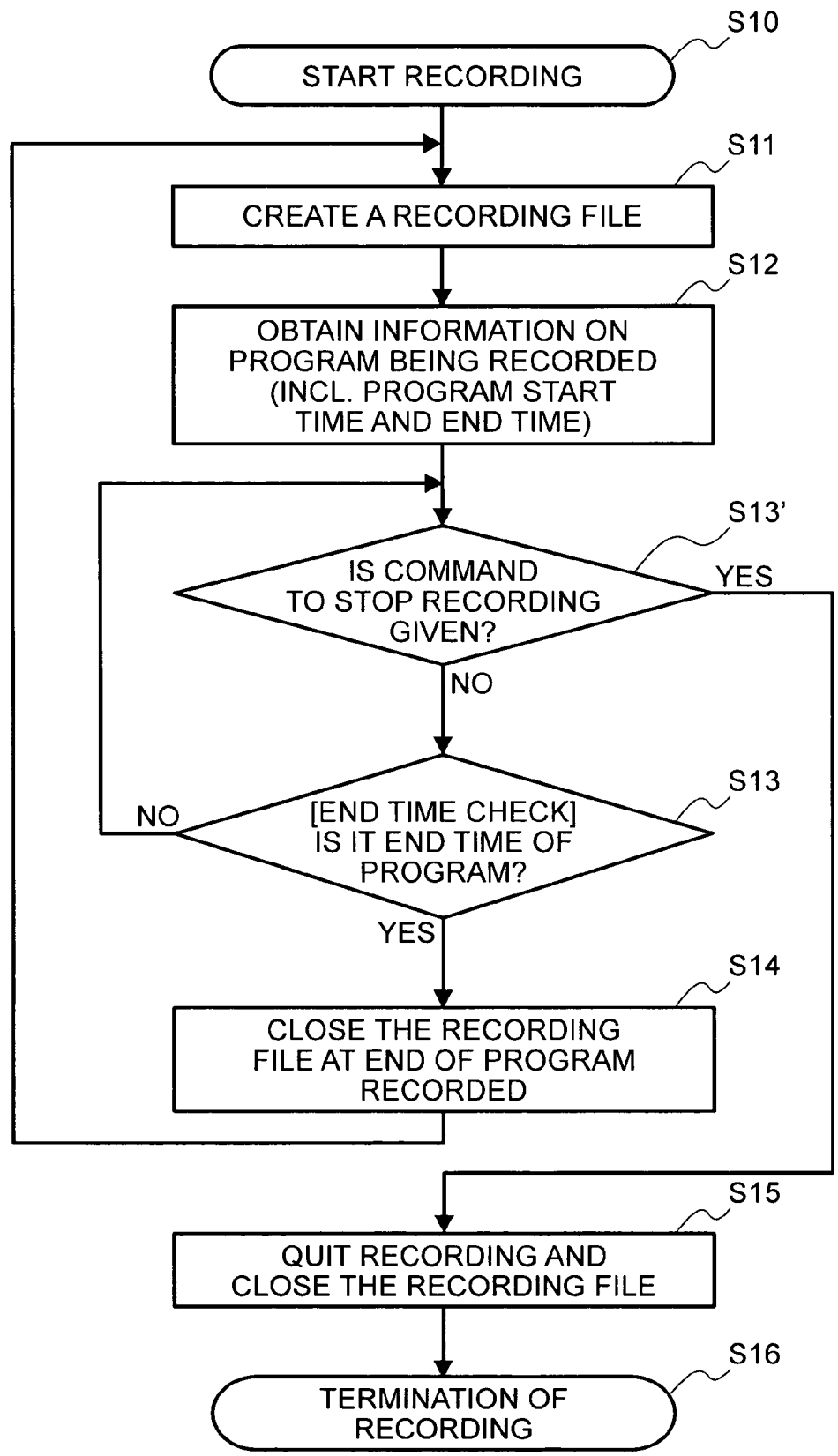
FIG. 11 is a flowchart to explain a digital broadcast recording method that is applied in the above digital broadcast receiver.

FIG. 11 attached illustrates operation in the case where the user commands the start of recording by pressing the "RECORD" button 143 located in the lower part of the remote controller 140, e.g., as shown in the above FIG. 5, instead of the booked recording operation illustrated in the above FIG. 1. As is apparent from the figure, essentially the same steps as described in the flowchart of the above FIG. 1 are performed. However, after the step S12 is executed, the receiver checks if a command to stop the recording is given by the user; in particular, by pressing the "STOP" button 144 on the remote controller 140 (step S13'). As a result, if the stop command is given ("YES"), the procedure goes to the step S15 and the receiver quits the recording; otherwise, if not ("NO"), the procedure goes to step S13 and end time checking is performed as described above. Other steps are the same as described in the above FIG. 1 and their explanation is not be repeated here.

The foregoing description concerns the operation in which video and audio data of broadcasts on the user-selected channel during the user-specified time zone only is recorded on the HDD 150 included in the digital broadcast receiver 100 in which the present technique is embodied. However, in addition, the technique is applicable to a case where such data is transferred to and recorded on an external storage device, such as a video tape recorder (VCR) and a DVD recorder after being processed by the NTSC encoder 128 and the D/A converter 129 shown in the above FIG. 2.

In this case, the CPU 132 sends infrared control signals through the IR transceiver 135 to the external storage device. Specifically, in the flowchart described in the above FIG. 1 or FIG. 11, sending of a "STOP" command to stop the recording operation though the IR transceiver 135 is performed instead of closing the recording file in step S14 and sending of a "REC" command to start recording is performed in the step S1. Furthermore, even in a case where a high-speed digital interface such as IEEE1394, which is, however, not shown in FIG. 2, is used to output digital data to a digital recording device, the video signal stream can be recorded, separated into the files program by program in the same operation as described above.

According to this operation scheme, even if broadcasts on the user-selected channel during the user-specified time zone only are to be recorded, when video and audio signal streams broadcasted on the channel are recorded in the same way as described above, at the start and termination of each program broadcasted during the user-selected time period, recording start and termination actions will be performed. In particular, as for, e.g., the video tape recorder (VCR), at the beginning of each program, a separation signal to indicate the start of the program is recorded and this aids the user in editing the recorded broadcast contents afterward. As for the DVD recorder, by the recording start and termination actions, a new program will be always recorded in a new sector following the sector in which the preceding program terminates and this also aids the user in editing the recorded broadcast contents afterward.

Operations described above may be carried out by execution of software, firmware, or microcode operating on a processor based digital receiver/recorder or on a computer of any type. Additionally, code for implementing such operations may be in the form of computer instruction in any form (e.g. source code, object code, interpreted code, etc.) stored in or carried by any computer or machine readable medium.

Program aspects of the technology may be thought of a "products," typically in the form of executable code and/or associated data that is carried on or embodied in a type of machine readable medium. The executable code and/or associated data controls the operation of the broadcast receiver, recorder, computer or other programmable device for implementing the recording, playback or program guide functions. Media include any or all of the memory of the broadcast receiver or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from another computer (not shown) into the broadcast receiver or recorder or into another element, such as a web server used for software distribution or distribution of broadcast related information. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

Terms regarding computer or machine "readable medium" (or media) as used herein therefore relate to any physical medium or transmission medium that participates in providing instructions or code or data to a processor for execution or processing. Such a medium may take many forms, including but not limited to, non-volatile media and volatile media as well as carrier wave and physical transmission media.

As described above, according to the digital broadcast receiver and the digital broadcast recording method for use therein, in which the present technique is embodied, even if a booking is performed by specifying merely a time zone and giving a command to record a stream of broadcast contents on the user-selected channel during the time zone, the stream of broadcast contents on the channel is recorded, separated into a plurality of units of programs broadcasted during the time zone. Because separate files of recorded contents are produced in spite of booked recording for which only the time zone was specified, the later ability to manipulate manipulability of the recorded contents is enhanced and the user friendliness of the receiver can be improved.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of recording, comprising:
receiving an instruction specifying a time period for recording programming from an identified program channel;
receiving program data from the identified program channel over the specified time period;
identifying a plurality of programs represented in the received program data; and
recording received data representing each of the programs in a separate one of a plurality of program data files,
wherein the recording step comprises steps of:
opening a first program data file at a start of a first one of the programs;
recording received data representing the first program in the first program data file;

closing the first program data file and opening a second program data file, at an end of the first program or at a start of a second one of the programs; and recording received data representing the second program in the second program data file, wherein the step of recording received data representing the second program in the second program data file comprises:

recording received data representing the second program in the second program data file from the start of the second program to an end of the second program;

wherein the recording of the received data representing the second program in the second program data file continues past an end of the specified time period, upon the end of the second program being later than the end of the specified time period; and closing the second file and stopping the recording, at the end of the second program after the end of the specified time period.

* * * * *